Aug. 12, 1969 F. P. WILLCOX ET AL 3,461,235

DATA TRANSMISSION SYSTEM AND PRINTER

Filed Aug. 17, 1965 11 Sheets-Sheet 2

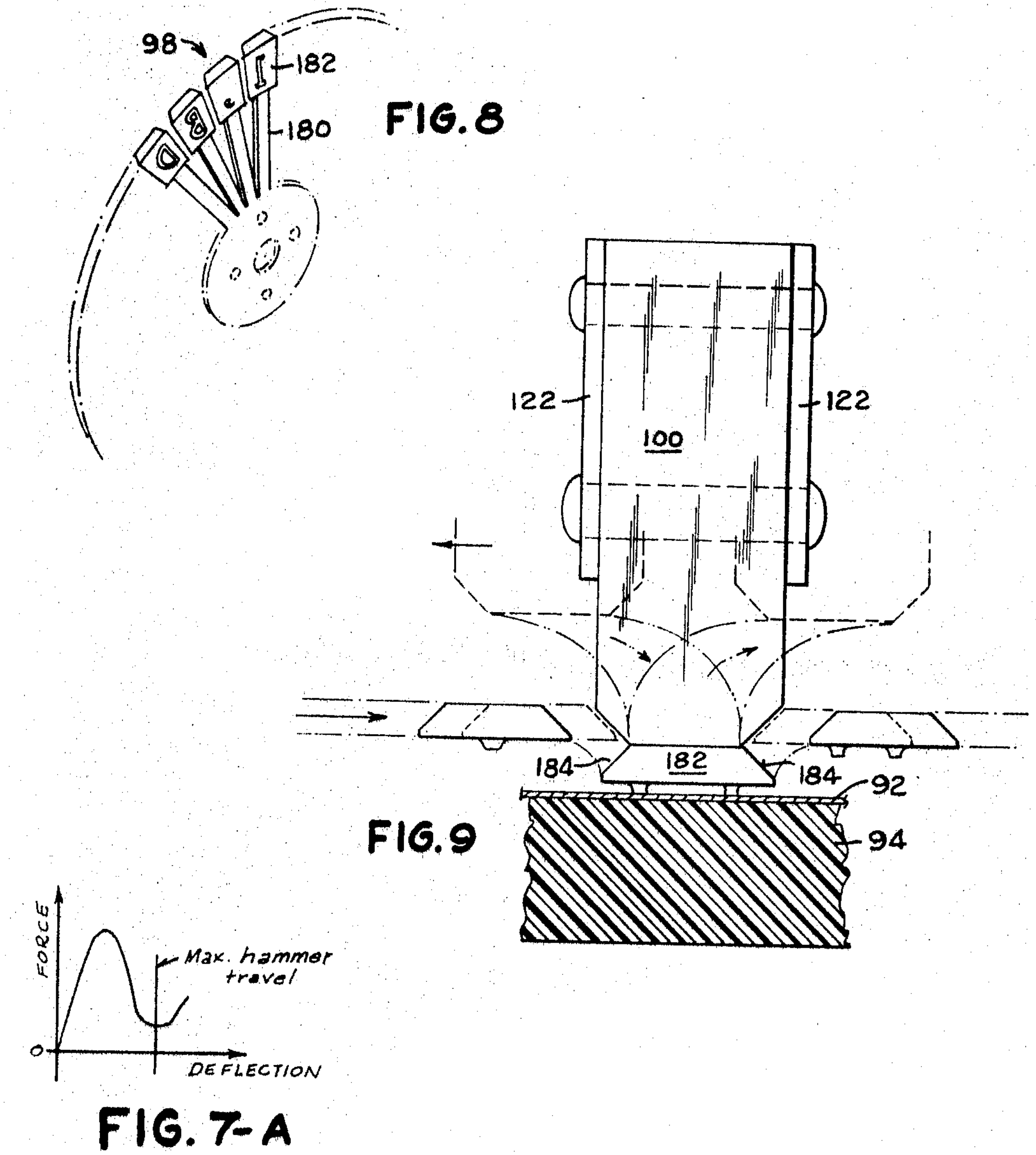
FIG. 8, FIG. 9, FIG. 7-A

DATA TRANSMISSION SYSTEM AND PRINTER

Filed Aug. 17, 1965 11 Sheets-Sheet 6

DATA TRANSMISSION SYSTEM AND PRINTER

Aug. 12, 1969 F. P. WILLCOX ET AL 3,461,235

DATA TRANSMISSION SYSTEM AND PRINTER

Filed Aug. 17, 1965 11 Sheets-Sheet 10

3,461,235

DATA TRANSMISSION SYSTEM AND PRINTER

Frederick P. Willcox and Newland F. Smith, New Canaan, Conn., assignors, by direct and mesne assignments, to International Business Machines Corporation, Armonk, N.Y., a corporation of New York Filed Aug. 17, 1965, Ser. No. 480,334
Int. Cl. H04l *15/34, 17/16*
U.S. Cl. 178—25 23 Claims

ABSTRACT OF THE DISCLOSURE

A single type wheel is continuously rotated at a constant speed, with the typefaces in a given plane. A writing line on paper is just outside of and parallel to the given plane. A code signal indicates which typeface is under a print hammer. When the code signal corresponds to the desired typeface, the print hammer is actuated, printing a character. Then the type wheel is stepped to the next print position.

This invention pertains generally to the field of telecommunications, and in particular to that portion of the field which deals with the transmission and reception of messages in alphabetic and numeric form between stations equipped for the production of a printed record of messages transmitted and received over a channel connecting such stations.

Printing telegraph systems and apparatus have been the subject of a great deal of development work in the prior art, culminating in the widely used teletypewriter systems which employ a normally open or normally closed direct current pulse circuit for short transmission distances, and modulated alternating current circuits or radio links for longer distances. Typically, such systems employ at each end of a channel a relatively bulky, noisy and expensive page printer, often with auxiliary punched-tape recorders (perforators) and readers for message storage and routine purposes. Where the information being handled is largely in the form of numerical data, systems are known which employ coded audio-frequency tones transmitted over ordinary voice or telephone channels, the coded data tone combinations usually being generated under keyboard control (or directly by the operation of known business machines) and, upon reception, being recorded in their coded form or applied immediately to the control of another business machine. Systems of this "data tone" type do not, without more, yield a printed record of the information handled.

It is a principal object of the present invention to provide a data communication system for transmitting messages between stations by means of coded high speed tone pulse groups, and utilizing at each station a keyboard-controlled message printer which includes within itself all the facilities needed for making a local printed record of a message to be transmitted, as well as for encoding the successive characters of the message and preparing it for immediate transmission over a voice-frequency circuit; said message printer also including all needed facilities for receiving and decoding a received message, and for printing a record thereof. By integrating the design and construction of the keyboard-controlled printer (whose printing mechanism is also controllable from the remote station) with the requirements of the message form employed, great savings are effected in the size, weight, cost and complexity of the terminal equipment, the operating speed is increased, the maintenance requirements reduced, and reliable operation is obtained even over relatively low-quality telephone-type circuits.

A further object of the invention is to provide a novel design of printer, controllable from a local keyboard or from a remote source of coded pulses, in which the operation of parts related to the printing function is directly coordinated to the requirements of the pulse transmitting and receiving system employed. As compared with known arrangements in which a more or less conventional "typewriter" is employed, with the auxiliaries needed to accommodate it to telecommunications, the savings in size, weight and cost are truly spectacular; a complete station printer according to the present invention having less than half the weight and bulk of a conventional typewriter, yet including all of the required message coding, decoding and timing features.

In general, the invention provides a printer whose printing element is a single unitary and preferably constantly rotating wheel, disc, basket or the like, the individual printing typefaces being deflected momentarily into printing contact with the impression paper by the action of a printing hammer. The wheel and hammer (and an operating magnet for the latter) are the only parts carried by a carriage which slides stepwise along a shaft to bring the carriage into successive character-printing positions to print a line, and the same shaft transmits the (constant) rotation to the wheel. To effect printing of a selected character at each position along the line, the timing of the hammer impact at each carriage position is closely coordinated to the instantaneous rotary position of the wheel (and hence of the shaft) by the matching of a received code group against a coded optical disc carried by the shaft. Means are provided for rapidly returning the carriage at the end of each line, within the time allotted to a single character-printing operation, and for advancing the impression paper the proper distance upon completion of each line. The printer also includes provision for spacing the carriage without imprinting a character when a word space is to be provided, and for either spacing the carriage, or imprinting a special character, if an invalid, incomplete or other wise erroneous code signal is received.

Since various functional operations of the printer such as carriage advance, carriage return, paper feed and the like are desirably effected within the time of one rotation of the printing wheel, and since the instant of printing impact within each rotation period is entirely arbitrary depending upon the order in which particular character code groups are received, means are provided for the interim storage of individual code groups as received, for use when all the operations called for by the preceding group have been accomplished or initiated, whereupon the operations called for by the stored code group can be commenced, and so on. The use of this interim storage principle contributes in an important way to the high average operating speed of the unit, and to its error-free operation.

While the invention is not limited thereto, the coding system and tone frequencies of the invention as described herein are particularly designed for use over standard telephone voice circuits, and can be coupled into and out of such lines by acoustic or inductive coupling means which do not interfere with the normal use of the telephone instruments for voice communications. Signalling means are provided so that an operator at either station may break into a period of data communication to obtain voice communication as desired. The coding system is also well adapted for the operation of code recorders and reproducers of punched type, magnetic record or other types, where such auxiliaries are desired.

The invention also provides for the transmission of a special end-of-message code group, which when received at the other terminal may control the shutdown of data tone receiving operations, as well as restoring the telephone line to its normal condition to await another call or communication; it may also cause the printing of an end-of-message character on the impression paper.

The invention will now be described in detail, for purposes of illustration and clear understanding thereof, but without intending thereby to limit the invention, in connection with certain preferred embodiments as shown in the accompanying drawings, in which:

FIG. 1 is a block diagram of equipment comprising the invention as utilized at one station terminating a communication channel; in use, of course, another terminal station connected to the opposite end of the channel will be provided with similar or equivalent equipment.

FIG. 2 is a graphical representation of a typical character code group, showing a "start" pulse or bit distinguished by a frequency-shift upwards from a neutral frequency of an audio carrier signal, and a set of "message" pulses or bits following the start pulse at accurately timed intervals, the message bits being constituted by momentary shift of the carrier to a lower frequency at certain of those intervals.

FIG. 7A is a force-deflection diagram of the disc spring for the printing hammer assembly.

FIG. 8 is a fragmentary perspective view of a portion of the printing wheel element of the printer.

FIG. 9 is a diagrammatic edge view of a part of the printing wheel, illustrating the action of the printing hammer.

As indicated above, the present invention as a whole provides a special system for data (including alphabetical and numerical) communication which is characterized by extreme flexibility of application as to the kinds of channels over which it can operate, as well of compactness and relatively low cost of the components. Certain features of the system terminal equipment are specially designed for control of, and control from, the novel printer which is also a part of the invention. Certain operating parts which are necessary for the successful operation of the printer are also availed of in connection with the control of the terminal equipments and pulse code handling adjuncts, so that in combination, considerable economy of components is attained. Before describing in detail the novel keyboard controlled (and remotely controllable) printer itself, a general description of the system as a whole will be given as an aid to orientation and understanding.

Figure 1:
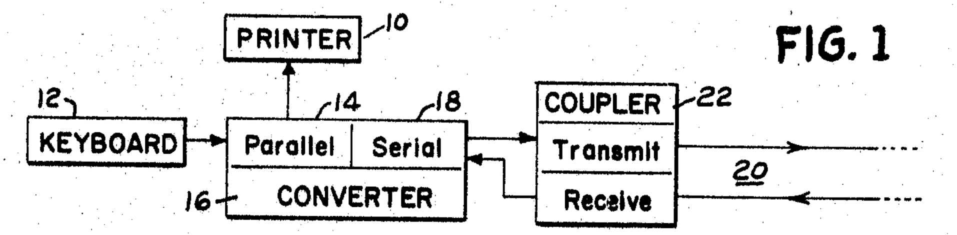

Referring first to FIG. 1, numeral 10 indicates the "printing" portion of the printer, considered here as divorced from the keyboard so that it will be understood that this printing portion can be remotely controlled over the communication channel. In actual fact, a keyboard for operation of the same printing mechanism is provided in the same structural unit, but for purposes of FIG. 1 it is shown as a separate element 12, specifically as one whose keys make parallel sets of contact closures corresponding to the various characters, letters, numerals or functions, the combinations of contacts thus closed by each key uniquely representing the desired character or function. In this sense, the keyboard output is a time-parallel code group, if the various selected contacts are simultaneously closed upon each key operation. Hence, the output of keyboard 12 is shown as controlling the "parallel" section 14 of a parallel-to-serial converter 16, the corresponding time-serial output, in the form of timed pulses occurring (or not occurring) at specified spaced instants of time, being derived from the "serial" section 18.

Insofar as the keyboard 12 directly controls the printer 10 of the identical station or terminal, the "parallel" section of converter 16 is shown as directed to the printer 10. However, it must be realized that the parallel-to-serial converter 16 is diagrammed as a reversible one (and it may be such in practice), so that serial pulse groups incoming from the communication channel indicated at 20 are converted to parallel form for control of the same printer 10. The arrangement permits additional functions to be performed, such as the recording (as by magnetic or perforated tape) in time-parallel form, of incoming messages arriving in serial form.

A generalized form of coupler is indicated in FIG. 1 at 22, and in the description which follows this section represents the means by which the coded pulse groups described above are converted to frequency shifts in a carrier at audible frequency for transmission over a conventional telephone line, and by which incoming tone-shift signals of the same type are received and converted to suitable form for operation of the printer (or for recording). With these provisions, it will be clear that the terminal equipment is able to communicate with another similar terminal over a telephone or other wire line, or, with the use of suitable conventional radio equipment, over radio circuits, and so on. Channel 20 is intended to represent the local end of any such circuit.

Figure 2:
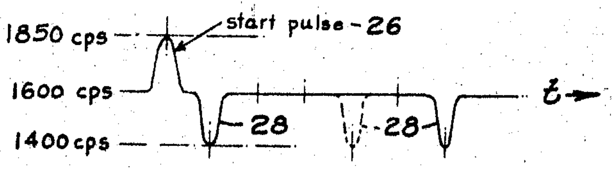

FIG. 2 illustrates graphically the selected form of code group corresponding to one character, sign or function. The unmodulated carrier frequency is shown an 1600 cycles per second, and the frequency is momentarily shifted to the value of 1850 cycles at the commencement of each code group, to provide the distinctive "start" pulse or bit 26. Thereafter, at equally spaced intervals about 5 milliseconds apart, the carrier may be momentarily shifted to a frequency value of 1400 cycles per second. The number and time-position of these latter frequency shifts is selected in accordance with a predetermined code scheme, so that each character, sign or function is uniquely represented by a particular combination of bits. A few of the possible six (in the present example) "message bit" pulses are indicated at numeral 28. With a 5 millisecond spacing between all the bit pulse positions, the total of seven bits (including the "start" pulse) is completed within about 35 milliseconds, or something less than the 50 millisecond figure corresponding to a speed of 20 characters per second. To provide the proper pulse spacing and the distinctive start pulse, as indicated in FIG. 2, and to receive and act upon such groups, equipment is provided as described below.

Figure 3:
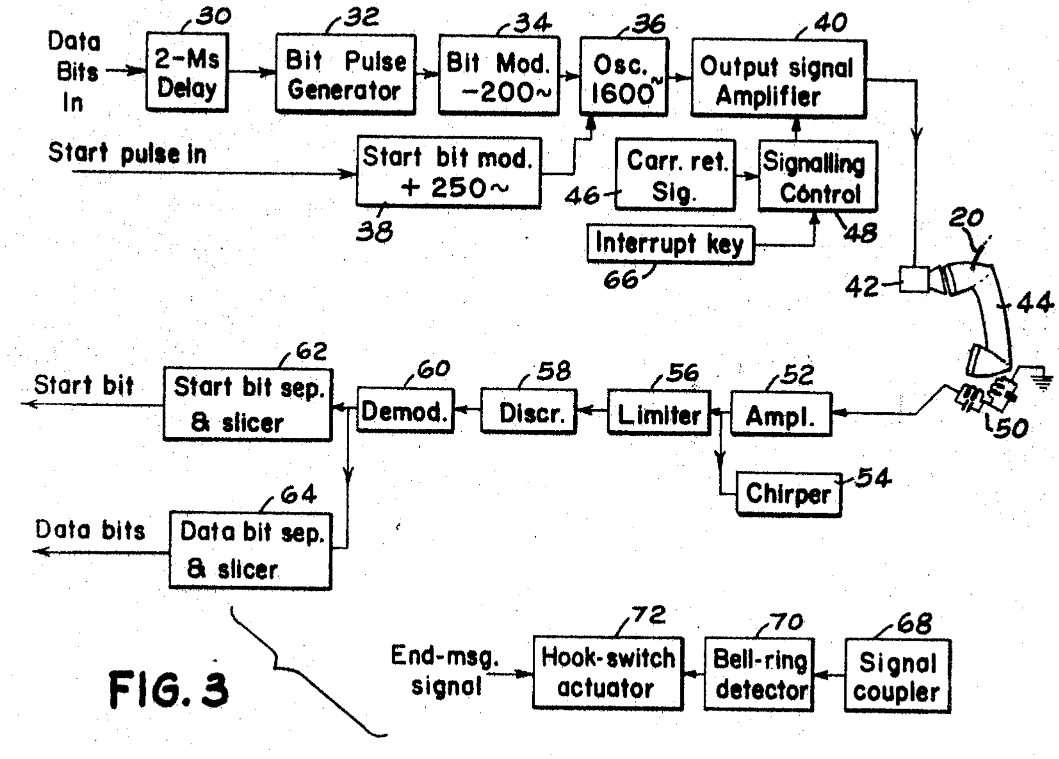
FIG. 3 is an expanded block diagram illustrating the arrangement of frequency or tone-shift serial bit equipment for both transmission and reception over a standard telephone circuit.
Figure 4:
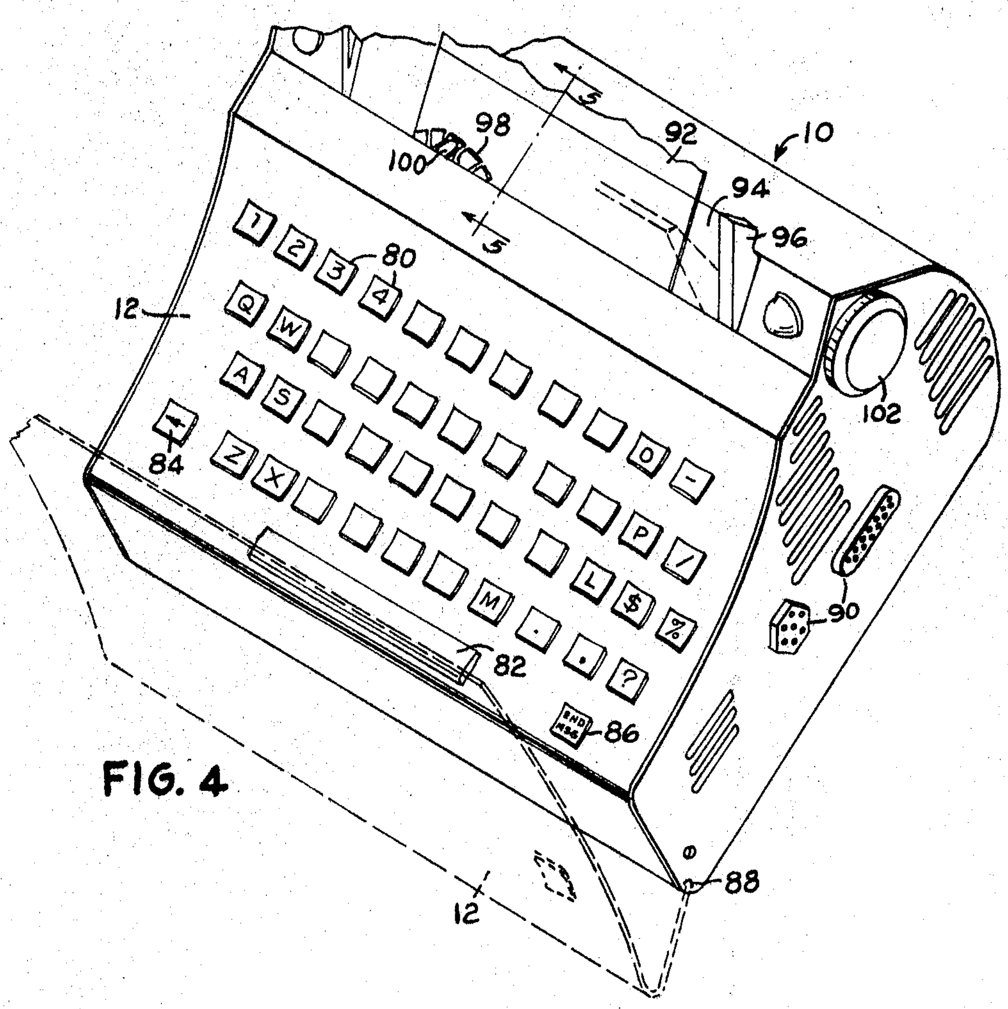
FIG. 4 is a perspective view of the novel printer apparatus used in the invention both for transmitting messages and for recording or printing those which are received.
Figure 5:
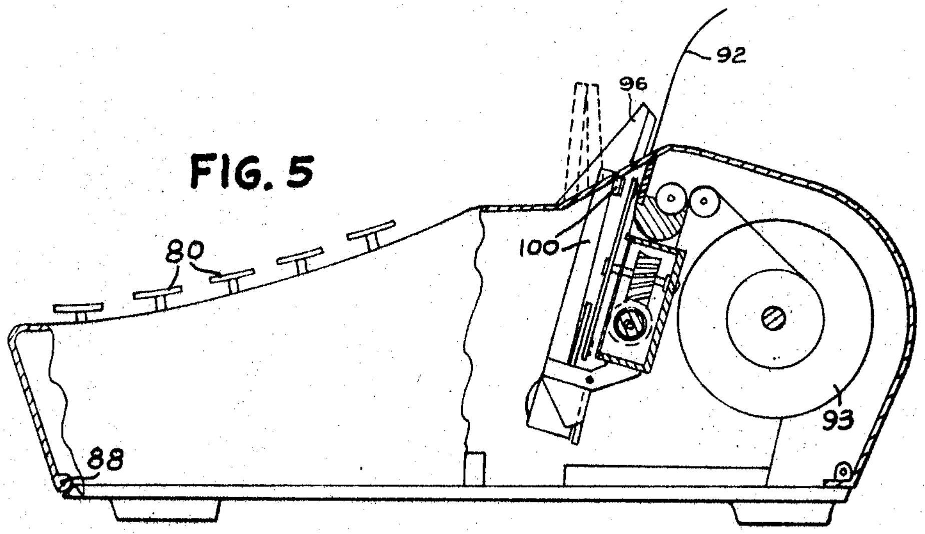
FIG. 5 is a side elevation of the printer of FIG. 4, with certain parts seen in section along the line 5—5 of FIG. 4.

FIG. 3 indicates in block form equipment specially directed to the conversion of locally generated code groups to a suitable frequency-shifted form for application to a telephone instrument and line, and vice versa for received or incoming frequency-shifted signals. At the upper part of this diagram, data or message bits (like pulses 28 of FIG. 2) received from a keyboard, for example, and serialized, are applied through a short delay circuit 30 to a bit pulse generator 32 which converts them to properly shaped and spaced pulses, and applies them to the frequency modulator 34 so as to drop the normal 1600 cycle frequency of oscillator 36 to 1400 cycles for the duration of each data bit. The separate start pulse, derived from a common contact closure of the keyboard, from an "Or" circuit, or however, is applied to the modulator 38 which correspondingly raises the frequency of oscillator 36 as indicated at 26 in FIG. 2. Amplifier 40 amplifies the tone signals and applies them to a transducer 42 (operating as a loudspeaker) placed near the microphone of a telephone handset 44, if the chosen channel is of that type.

Since the other terminal will generally be connected to a printer for receiving messages, it is prudent to commence each new transmission with a "carriage return" signal so that both printers will be ready to start printing at the beginning of a line. The occurrence of such a carriage return signal, as at block 46 in FIG. 3, is also utilized by means of signalling control 48 to introduce a positive feedback loop into the amplifier 40, causing it to oscillate (independently of oscillator 36) for a full 50 millisecond period following each operation of the keyboard's carriage return key. The reception of this distinctive audible note is manifested at the other terminal as described below, to indicate also to the receiving party, if he is in attendance, that the data message has commenced; the printer that location might not manifest such commencement, if its carriage were already in the returned position.

Still referring to FIG. 3, but now proceeding from right to left, the incoming pulse groups, or sequences of carrier tone shifts (and for clarity visualizing the station as the one at the other end of the channel 20), are picked up from the received portion of the handset 44, acoustically or as shown by induction field pickups 50 (two in series, respectively tuned to the up- and down-shifted carrier tone, or shown by preference) and applied to the amplifier 52. If the carriage return tone signal is received, it is made audible at good level by the "chirper" or speaker 54. From amplifier 52, the tone pulses are limited at 56, frequently-discriminated at 58, demodulated at 60, and applied as DC pulses to the respective start-bit separator 62 (which performs also a clipping or amplitude-slicing function) and data-bit separator 64. Thence the two kinds of pulses are conveyed to the local printer through circuitry to be described below.

The "Interrupt key" 66 is a useful auxiliary, and may be provided at the local printer's keyboard or elsewhere; it operates the control 48 as before to apply a continuous signal tone to the chirper 54 at the opposite end of the channel, notifying the sender at that end that the other party wishes to transmit, or to talk to him over the telephone line. This is readily accomplished, as the presence of the printer equipment in no way interferes with ordinary functioning or use of the instrument 44.

FIG. 3 also indicates symbolically an arrangement by which, if the handset 44 is left in coupled position to the speaker 42 and pickups 50, the station may receive data messages even though not attended by an operator. Either an acoustic or magnetic field pickup 68 in coupled relation to the station's telephone call bell controls a bell-ring detector 70, and this when the telephone is called lifts the hook switch or cradle switch of the telephone unit, as by actuator 72, opening the telephone line for communication until the actuator 72 is automatically restored upon a receipt of an end-of-message signal over the same line.

With the foregoing general objects and operations of the system as a whole in mind, the special design of the novel keyboard-printer unit of the invention, including its special features of cooperation in such a system, will now be described. In FIGS. 4 through 9, to which attention is now directed, the printer as a whole is again designated by numeral 10, and has incorporated therein the keyboard 12 providing character keys such as 80, space bar 82, carriage return key 84, and an end-of-message key 86. All of these are carried on a keyshelf preferably pivoted as at 88 along the lower front corner of the overall housing of the printer, to allow the keyshelf to be tipped up and forward for easy access to the interior of the housing, which contains most of the electrical and electronic printer operating circuits. Conventional jacks as at 90 are provided in the housing for connection of the internal circuits of the printer to other components as described herein. Each of the various keys establishes, by one means or another, the selective closure of plural control circuits to accomplish in effect the coding, in parallel, of the designation corresponding to that key.

Thus, and most simply, each key may operate one contact set which is paralleled with the corresponding set of all other keys, to signify that some key has been struck (which information will later be employed to initiate the "start" pulse of the code group), and the same key will also operate one or more other contact sets which are in groups of circuits, to establish a permutation of those circuits uniquely identifying the particular key which was struck. Keyboards of this type are known, and such will be assumed in the remainder of this description, but various other arrangements are known and possible. Thus, the keyboard may cooperate with a diode or transistor matrix to allow the permutated circuits to be energized in response to the closure of a single set of contacts by each key, or a keyboard of the type shown in our copending application Ser. No. 276,524, now U.S. Patent 3,290,439, may be employed.

The actual printing of characters is accomplished, in this printer, by impacting type faces against suitable impression paper 92, supplied from a supply roll 93 within the housing and over a flat backing plate 94 corresponding in function to the platen of an ordinary typewriter. It is faced with a tough resilient (nylon) impact receiving material. The paper is held flat against the plate 94 by a preferably transparent hold-down or guide 96 (shown tipped forward in dash lines in FIGS. 4 and 5). The machine does not employ a moving paper carriage, but on the contrary the paper is impacted by type faces carried at the ends of flexible spokes forming the type wheel 98, by a hammer 100, the wheel and hammer being mounted on a carriage bodily slidable along a guide parallel to the writing line. No inked ribbon is shown in the drawings, as it is more convenient to employ pressure-sensitive paper such as "Action" paper as marketed by the 3–M Company, or similar papers available from the National Cash Register Company (NCR paper), but no limitation as to the marking procedure is intended in this respect.

In operation, type wheel 98 is rotated constantly at an adequate speed, and selected characters are imprinted by operating the hammer 100 at the precise instant, during each revolution, at which the desired character is in position to be imprinted. After each impact, the carriage is advanced one incremental step of movement to the right. Such a step is also made without any type impact to provide the "space" function. To return the carriage to the left, the carriage return key 84 is operated. A hand knob 102 is provided for advancing the paper when threading it into the machine, or at other times, but means are provided for advancing the paper an appropriate amount in connection with each carriage return operation.

It is found that the combination of the flat backing surface for the paper provided by the plastic-faced or plastic platen 94, and the considerable effective length of the radial typeface carrying spokes of the wheel, together with the pivoting of the hammer arm 122 (as at 124) at a substantial distance from the impact point, provides numerous advantages. The paper is held flat throughout the impact area rather than in a curved plane as in the case of the conventional roller platen, allowing a perfect impression with a relatively light or "kissing" contact of the typeface, and extending the life of the typeface immeasurably; so much so that an ordinary aluminum alloy can be employed for the wheel and spokes as contrasted with the extremely hard metal faces used heretofore. At the same time, and even though the same platen line area is repeatedly struck by the types through the paper, there is a complete absence of the "keyholing" of the platen surface which leads to early deterioration of conventional soft rubber roller platens. Also, the machine utilizes a very much shorter "throw" of the hammer head 100 than the comparable travel of ordinary type bars or ball type printers; this motion in the present machine is only a few hundredths of an inch, and the snap-type control of the hammer motion (FIG. 7–A) practically eliminates the need for absorbing a large amount of force or momentum in the platen material.

Figures 6, 7:
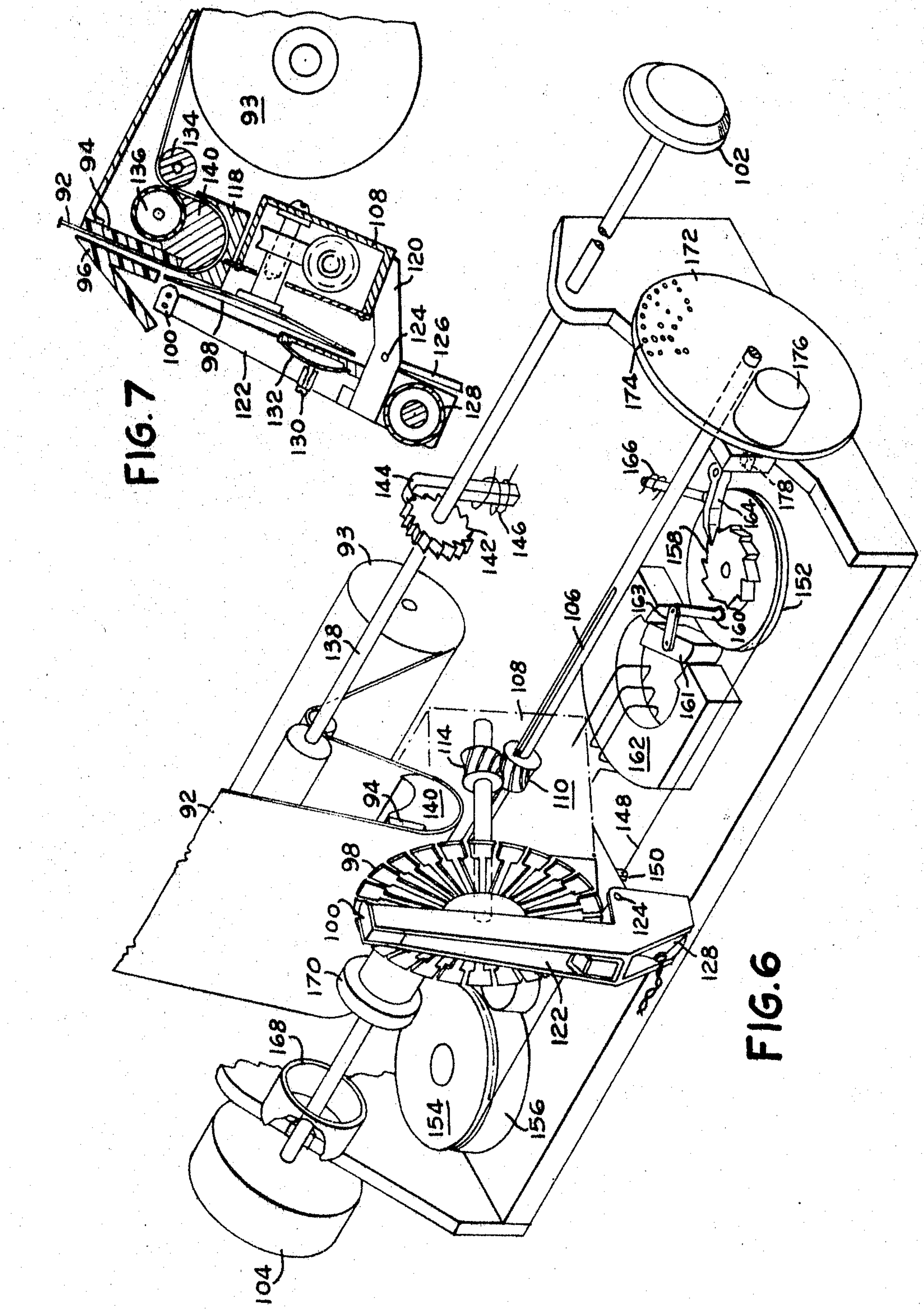
FIG. 6 is an exploded perspective view, with parts broken away, of certain mechanical and electrical operating parts of the printer.
FIG. 7 is a fragmentary enlarged sectional view of the printing carriage mounting structure and printing mechanism, looking in the same direction as in FIG. 5.

The construction and arrangement of the mechanical parts of the printer will be understood by referring now to FIGS. 6 and 7. A drive motor 104 is constantly rotating when the machine is in use, and it rotates (for example, at 1750 r.p.m.) a shaft 106 suitably journalled in side frame plates of the printer; this shaft also furnishes the principal slide guide for the type wheel carriage mentioned above, and it therefore extends parallel to the direction of the writing line. The moving carriage comprises a box-like housing 108 through which shaft 106 passes, and within the housing there is journalled a helical drive gear 110 having a splined connection with the shaft, so that the gear is constantly rotated by the shaft, yet is slidable thereon. Also journalled within the housing 108 is the print wheel shaft, secured to a second helical gear 114 meshing with gear 110. Shaft 112 is perpendicular to shaft 106 (that is, it lies in a plane perpendicular to shaft 106), and projects from the front of the housing to carry the print wheel 98 in the position best shown in FIG. 7, so that the upper portion of the "rim" of the wheel, actually the typeface engraved individual tips of the flexible spokes, lies just beneath the lower edge of paper guide 96, and slightly spaced from the impression paper 92. The spacing is such that, when hammer 100 strikes the forward face of each spoke tip, it is impacted against the paper, and its engraved opposite face makes the desired character imprint thereon.

Gear housing 108 has a forward cover plate whose upper edge (FIG. 7) slides in a groove on the underside of a fixed bar 118 which is part of the paper guide system, thus holding the housing 108 at the proper angle for its desired sliding motion along shaft 106. Depending from the bottom of housing 108 is an arm 120 which projects forward to provide a support for the striking hammer arm 122, pivoted on arm 120 at 124. Hammer arm 122 is formed at its lower end as an armature 126 which, when a magnet 128 is energized, is attracted toward the magnet poles and thus rocks hammer arm 122 to carry its hammer end 100 smartly against the type wheel spoke which is to make the imprint. In order to provide a high speed or "sudden" impact with a high velocity at the impact point, but without damage to the backing surface or the type wheel, hammer arm 122 carries an adjusting screw 130 which contacts a cone-dished spring disc 132 secured to support arm 120; the spring disc provides an initial resistance to arm motion until the magnet's driving force approaches a maximum, followed by quick release of the energy built up by the magnet 128 as diagrammed in FIG. 7–A. The limit of hammer arm motion is set by contact of armature 126 with the magnet pole, and spring disc 132 aids in restoring the arm quickly. It also has a lockout effect due to its high metal resistance to deflection, even when arm 122 is fully returned to its rest position, preventing any rebound of the hammer from this position.

The paper 92 from supply roll 93 passes about an idler roller 134 against which it is pressed by a rubber-covered drive roller 136 secured to paper drive shaft 138 (to which paper knob 102 is connected), rotation of the drive roller feeding paper into a narrow slot between the hemicylindrical lower surface of a fixed guide bar 140, and a correspondingly curved pocket in the fixed bar 118 mentioned above. The paper thus issues in front of the platen-like plate 94 as already described, and behind the paper guide 96. A ratchet wheel 142 secured to paper drive shaft 138 allows the shaft to be intermittently rotated the correct amount (corresponding to one line of print) upon each operation of a drive pawl 144 by a magnet indicated at 146. It is obvious that while the paper is here shown as being "pushed" around the guide bar 140, a slight rearrangement will enable a paper-pulling type of feed to be performed.

To accomplish sliding movement of the typing or printing carriage, a flexible cable 148 is secured thereto as at 150, and also to a pair of drums 152 and 154, the latter being constantly urged in one direction (to move the carriage to the left, from the operator's position) by a constant-force spring 156 such as a "Neg'ator" spring. To step the carriage to the right, with each character imprint or space, the other drum 152 is connected to a ratchet wheel 158 whose drive pawl 160 is arranged to be operated by a magnet 162 to rotate the ratchet wheel one tooth-space at a time. A restraining pawl 164 holds the carriage against retrograde movement, but can be withdrawn by a magnet 166 energized when the carriage is to be allowed to return to the left to commence a new writing line.

Drive pawl 160 is normally out of contact with the teeth of ratchet 158, held there by a light restraining spring and a backstop. The pawl is driven into the ratchet by an arm 163 secured to a rotatable armature of iron 161 lying in the gap of the C-shaped or meter-movement type of magnet core 162. The armature 161, in its rest position as shown in FIG. 6, is turned slightly counterclockwise from its aligned position with respect to the magnet pole faces, and when the magnet coil is energized, it rotates in the clockwise direction to drive pawl 160 by a kind of toggle action, so that there is no overtravel of the ratchet, or only just sufficient to ensure that restraining pawl 164 drops positively behind the next tooth of the ratchet. The arrangement thus described is found able to produce the carriage advancing motion very quickly and positively, but without unnecessary strain on the parts or an excessive drive current in the magnet coil.

In order to cushion the carriage at the end of its return motion against any high speed stopping impact due to spring 156, which is made quite strong to obtain rapid return of the carriage (preferably within the time allotted to one character imprint), a dashpot cup 168 is secured about shaft 106 on one end plate of the framework, to receive a piston 170 which is actually a lateral projection from the left side of the carriage for the typewheel (that is, the piston formation is a projeciton from gear box 108). Near the end of the carriage return stroke, the piston enters the dashpot cup, and the restricted leakage of air from the cup decelerates the carriage very smoothly and effectively.

In order to relate the triggering of the type hammer action to the rotation of the type wheel, so that a particular selected character will be imprinted (or other function, such as a carriage return, accomplished), the shaft 106 carries, for rotation therewith, a code wheel 172 carrying sets of radially disposed apertures 174, each radial pattern corresponding in number and spacing of apertures to the number and spacing of the message-bit pulses for one character or function. As type wheel 98 rotates, disc 172 rotates with it, so that as a particular wheel spoke arrives at a point sufficiently in advance of the imprinting position, so as to arrive exactly at printing position at the time it is impacted by the printing hammer against the impression paper, the corresponding pattern in disc 172 arrives in the optical path of a sensing system between a light source 176 and a plurality of photosensitive cells 178 equal in number to the number of code bits employed—six, in the system being described. When the pattern of energization of these cells matches that defined by a message-group pattern set up by the operation of one key of the printer keyboard (or, as will appear below, received over the communication channel), the hammer magnet 128 is energized to cause the imprinting of that selected character, and the carriage advance magnet 162 is then energized to advance the carriage ready for printing the next character thus decoded. Various aspects of the machine timing and operating cycle will be treated in the circuit descriptions which follow.

At the outer edge of code wheel 172, a timing, triggering or clocking aperture is provided in alignment radially with each radial group of coded apertures 174, so that "code reading" will be performed at a sharply defined instant relative to each wheel position.

FIG. 8 shows in an enlarged fragmentary perspective view a small section of the printing wheel 98, each of the spokes 180 being thinner in the direction of wheel thickness than in the circumferential direction, but still exhibiting a limited amount of resilience in the circumferential direction. The material of which the wheel is formed is springy, so that when a spoke has been deflected to bring the typeface 182 against the impression paper by a hammer blow, the typeface portion may remain in contact with the paper for an instant even though the wheel as a whole is still rotating, and thus helping to prevent smearing of the imprint. The same resilience restores the deflected spoke back into the general plane of the wheel (which may be slightly dished) very rapidly. The dishing of the type wheel is visible in FIG. 7. The natural frequency of the spokes, considered as resonant reeds, has to be taken into account along with the speed of restoration and operation of the printing hammer arm 100. In particular, it is found that the resonant frequency of the spokes should be sufficiently high so that the end of the spoke will not travel ahead of the hammer (toward the paper) as a result of the initial impact of the hammer against the spoke, and thus to prevent any secondary movement of the spoke sufficient to touch the paper prior to its main impact, or to interfere with any adjacent spoke tip or to bounce against the hammer if the latter has not fully returned to its rest position. In general, the resonant frequency should be such that ¼ the periodic time of the spoke should be not greater than the time interval between first contact of the hammer with the spoke and the impact of the spoke or typeface on the paper.

The end view of FIG. 9, greatly enlarged, shows by means of solid and dash lines the motions of the hammer and the printing spoke tip, as well as the chamfering of the lateral edges of the tip at 184 which prevents the hammer from catching upon the rear edge of the preceding spoke tip which is nearest the approaching hammer while it moves toward impact, and to prevent the hammer from catching upon the front edge of the succeeding spoke tip during its withdrawal after impact. FIG. 9 charts the relative motions of the type wheel and hammer, for clarity of understanding, as though the hammer were overtaking a stationary wheel, although in fact it is the latter which is moving in the direction parallel to the writing line.

It will be observed in FIG. 9 that the hammer arm is laterally rigid, and is formed of two plates or arms 122 spaced apart and slightly angled (see also FIG. 6) and with the hammer head 100 secured between them at their distal ends (from the pivotal mounting of the hammer arm), so that there can be no lateral flexing of the hammer arm. The described construction of the type spokes as well as of the hammer arm contribute in an important way to the successful accomplishment of nonstop or on-the-fly printing at adequate operating speeds.

Turning now to the control and operating circuitry for a system incorporating a printer of the type just described, it is at once clear that a basic difference from other systems lies in the fact that the actual instant at which printing of a selected character occurs is by no means determined by the instant at which a keyboard key is operated, nor by the instant when a code group received from a remote terminal is completed. The position of the type wheel is constantly changing, and the hammer cannot be operated until the character has been defined (by key operation or decoding of a received code group), and also not until thereafter the type wheel has brought the specified typeface to imprinting position, allowing for any time delays involved in the hammer actuation, et cetera. There is therefore an uncertainty (which may amount to as much time as is needed for approximately a complete type wheel rotation) in time, after character identification, when printing can be accomplished.

It follows that the identification of the character (or function) must be stored, and held in storage, until the instant for actuation of the hammer has also arrived. Also, it is necessary to observe that time must be provided for the restoration of the printing hammer after each imprint, so that a second character, if identified immediately following actuation of the hammer to print the preceding character, will not be lost because the hammer has not had time to return to its home position ready for another actuation. Similarly, time must be allowed for the carriage advance to be completed, after each character imprint, and its mechanism restored to ready condition, or an overprint may occur.

The invention, in its presently described embodiment, uses for this storage of the character-identifying bits, or code, a set of reed relay contacts respectively energized under control of the successive stages of a shift register, which shift register is also utilized as a parallel-to-serial converter when serially transmitted bits are to be derived from a parallel-input source such as the keyboard already described.

GENERAL OPERATION IN TRANSMITTING

Figure 10:
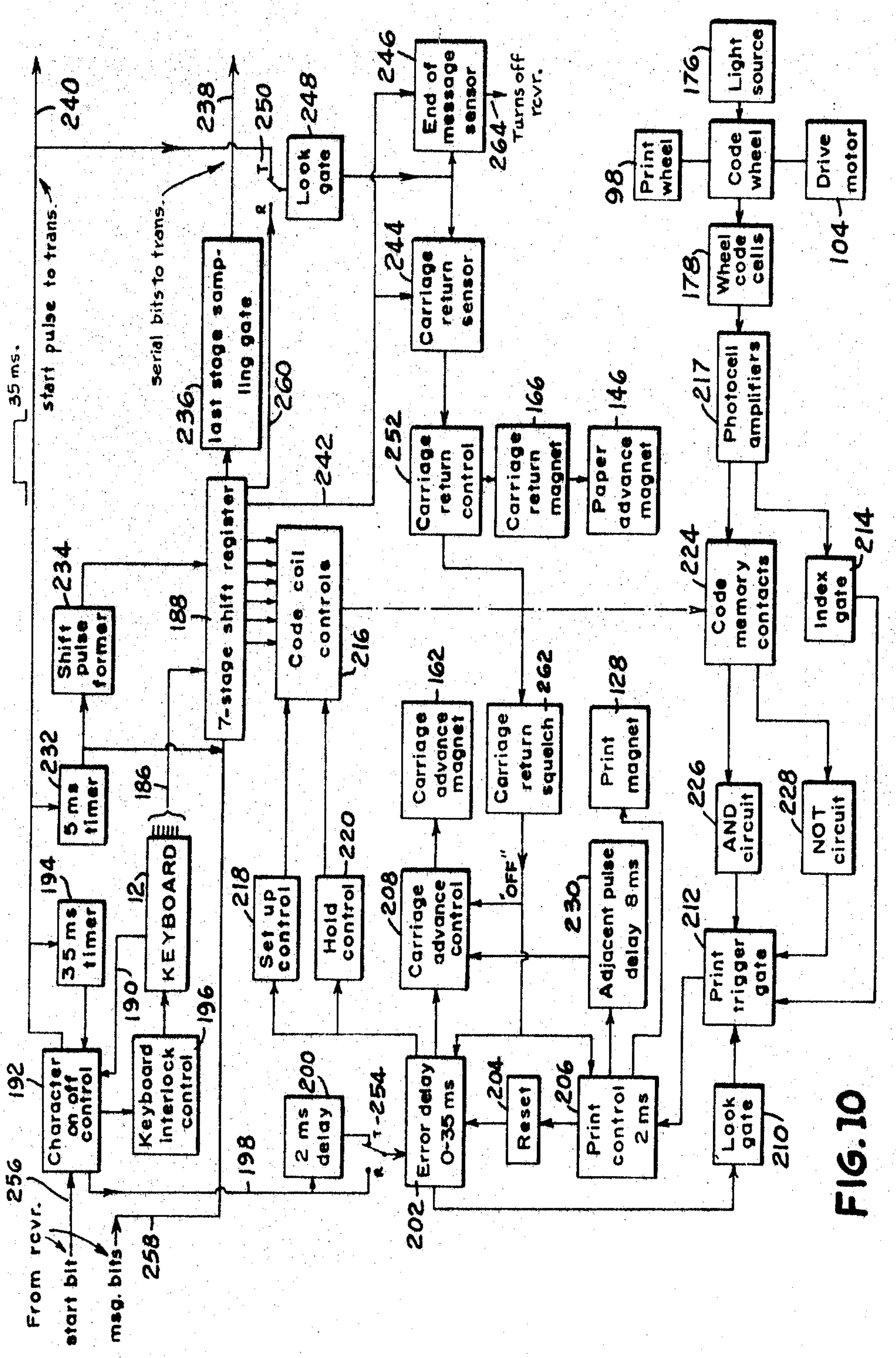
FIG. 10 is a more complete and detailed block diagram showing especially the electrical arrangements by which the printer keyboard is enabled to produce pulse groups suitable for transmission over a line to a second station, and by which the printing mechanism is enabled to respond to similar pulse groups received from such second station.

Referring now to FIG. 10, the essential components are shown in a single block diagram which actually illustrates all of the various modes of operation of the terminal, for example for both operation of the printer from receiving serial pulses, and from the parallel code groups produced by the local keyboard 12. Taking first the case of local keyboard operation of the printer (without considering as such the preparation of pulse groups in serial form for transmission over a channel), the message bit pulses which are in effect voltages appearing on the code bit defining contact busses of the keyboard, are applied over six conductors 186 to the respective six stages of a conventional shift register 188, to change those stages corresponding to the energized conductors 186 from their normal "off" conditions to "on." At the same time, the keyboard common contact applies voltage to a lead 190 to turn "on" a flip-flop or multivibrator 192 arranged to be turned off at the end of the time required for a complete serial code group (35 ms. in the present example, 7 times 5 being 35) by the 35 ms. timer component 194. In the keyboarding operation with which we are now concerned, the "on" condition of this on-off control now operates through the interlock control 196 to cut off the supply of voltage to the keyboard 12, so that once a key has been operated, the operation of another key before conclusion of the previous character period will not produce an error. The on-off control 192 also supplies, through lead 198 and a 2 ms. delay circuit 200 a turn-on signal to the error delay circuit 202 which is a monostable multivibrator which will reset itself at the expiration of a 35 ms. period, or may be reset sooner by reset control 204 if a print signal is received at print control 206 within that time. In either case, when error delay 202 is reset, it operates the carriage advance control 208 to energize the carriage advance magnet 162. If no print control signal is recognized within the 35 ms. delay period, corresponding to a full rotation of the printing wheel, a blank space (or a special character) will be produced on the paper, so that a lost character may be noted. This feature is, of course, much more important in connection with signals received over a line or channel, and signals any error that represents an invalid or unassigned code group, as well as the occurrence of a start pulse with no message bits thereafter in the character period.

The same signal over line 198 which operated the error delay 202 also turns on the "look" gate 210 whose function is to open the print trigger gate 212 at the proper time to accomplish printing of the selected character. It will be recalled that since the print wheel is rotating continuously, and so is its code disc 172 (FIG. 6), the light source 176 (lower right corner of FIG. 10) is constantly exposing various combinations of the photocells 178 through the code disc. It is necessary to allow actual printing only when the combination of energized photocells corresponds to that combination which the keyboard set up initially in shift register 188, and only when, also, the actual fine position of the print wheel is correct relative to the hammer operating time and other delays. The latter timing is controlled by a separate photocell which is energized by light passing through an additional timing hole in the code disc at the outer end of each radial row corresponding to the various code combinations. The energization of this "index" photocell is signalled by the index gate 214. Amplifiers for all of the photocells are indicated at 217.

It was stated that the storage of the called-for character code was accomplished by reed relays energized under control of the stages of the shift register 188. The operating coils of these relays are indicated in FIG. 10 by block 216, which also includes individual transistors supplying the operating current to them, under shift-register control, from the setup control 218 and the hold control 220, described in more detail below. For the present, it is sufficient to say that once set in energized condition under shift-register control, these relays remain operated even though the shift register stages are automatically shifted as an incident to the transmission of the corresponding serial pulse output groups. So long as the relays are held operated, their corresponding contact sets 224 are also closed, in the pattern called for by the keyboard key which was operated.

These relay contacts operate in conjunction with the AND circuit 226 and the NOT circuit 228 to control the print trigger gate 212 to open condition when and only when the aggregate of the photocells "reads" through the code disc the same code pattern set up by the contacts; and also only when the "index" gate 214 has been opened at the proper instant in the type wheel rotation. At that instant, the print control 206 is thereby operated to energize the print magnet 128 to accomplish printing of the selected character.

As an incident to the printing of the selected character, it is also necessary to furnish an operating pulse to the carriage advancing magnet 162. The operation of effecting a carriage advance, including the time required for the mechanism to restore itself, involves a certain minimum delay. Due to the random timing of the character printing operation relative to the start of each character period, it sometimes happens that a print pulse occurs at the end of one character period, and another one is called for near the beginning of the next character period. For a character rate of 20 per second, which is a 50 ms. character period length, the 35 ms. character length leaves only 15 ms. for accomplishment of the carriage advance and the flyback or recovery of the mechanism, which is inadequate. To solve this dilemma without sacrificing character speed, the invention introduces an additional 8 ms. "adjacent pulse" delay in the initiation of a carriage advance, but only where the "print" command occurs during the first third of the "error delay" or "look" gate period. When the print command occurs during the remaining ⅔ of the period, energization of the carriage advance will commence concurrently with the start of the printing command pulse, and of course printing will be accomplished before any actual movement of the carriage takes place.

It will have been noted in FIG. 10 that the operation of the print control 206 also resets the error relay multivibrator 202 through reset control 204. This resetting of the multivibrator involves the discharge of its timing capacitor to the carriage advance control 208 and is the normal source of carriage advancing action. However, this timing capacitor and its associated circuitry are so designed that if the error delay multivibrator 202 is reset during the first ⅓ of the character period, the charge available at that time on the capacitor is insufficient to trigger the carriage advance control 208. On the contrary, in such a case, the trigger pulse to the carriage advance control is supplied through the adjacent pulse delay circuit 230 after a delay (of 8 ms.) sufficient to ensure that the advancing mechanism has completely recovered from any prior recent operation thereof. In the more common instance of a print command occurring in the last ⅔ of the character period, carriage advance is triggered by error delay 202 concurrently with the operation of print control 206 and reset 204. Of course, the adjacent pulse delay 230 must be slightly shorter than the length of the carriage advance pulse produced by control 208, to avoid any possibility of a double carriage advance.

A complete cycle of operation of the printer has been described purely from the standpoint of keyboard control of the printing, and without reference to the provision of serial output signals suitable for external transmission. The operation of carriage returning from the keyboard has not been described, since it has special relation to operation of the printer under control of received pulse groups.

The way in which serial pulses are provided for transmission to a remote station will be obvious from the foregoing description of the keyboard control of the printer. The on-off control 192 having been turned "on," as already described, for a period set at 35 ms., it supplies voltage to the 5 ms. timer 232 which is a free-running multivibrator that furnishes an output pulse every 5 milliseconds to the shift pulse former 234, which is turn causes the on or off condition of each stage of the shift register 188 to shift to the right (leaving the code coil controls in their "hold" condition, of course, for printer control as described), and thus the keyboard-generated code pulses appear successively at 5 ms. intervals at the last stage of the register, are sampled by the sampling gate 236 and forwarded over the lead 238 to the transmitter (to be diagrammed below). The start pulse proceeds directly from on-off control 192, being constituted by the differentiated leading edge of its 35 ms. box car pulse, and is supplied to the transmitter over lead 240.

As indicated above, during reception the particular codes assigned to the carriage return function and to the end-of-message code are desired to be recognized as soon as they have been set up in the shift register, without waiting for their recognition during rotation of the print wheel and its code disc. In FIG. 10, numeral 242 designates, by a single line, extensions of the cathode output signal leads from the silicon controlled switch stages of the register 188 to diode code-recognition circuits or sensors 244 (to recognize the carriage return code) and 246 (to recognize the end-of-message code). However, these sensors are gated to provide useful output or control signals only at the proper time, by a "look" gate 248. This gate is controlled from two different sources, (a) when the equipment is receiving codes from the incoming channel and (b) when it is being operated from the keyboard (or transmitting). A manual transmit-receive switch 250, when set in "transmit" as for the kind of local keyboard control now being discussed, puts the look gate under control of the 35 ms. pulse on conductor 240. The end-of-message sensor 246 has no function under these conditions, but when and if the various stages of shift register 188 have been set in correspondence with a carriage return code established by operation of the carriage return key 84 of FIG. 4, the carriage return sensor 244 will supply voltage to the carriage return control 252, in turn energizing the carriage return magnet 166 and the paper feed magnet 146.

A second transmit-receive manual switch 254 is provided to bypass the 2 ms. delay circuit 200 when the equipment is receiving from the incoming channel; this second switch is conveniently ganged with switch 250 to provide a single control for this selection.

GENERAL OPERATION IN RECEIVING

Just as the outgoing start pulse and message bit pulses are supplied to the transmitter over separate conductors 240 and 238 as just described, incoming serial start and message bits are received (in the manner indicated by FIG. 3) over separate conductors 256 and 258 at the upper left corner of FIG. 10. Speaking generally, these incoming pulse groups control the equipment in much the same way as was described when controlled by the keyboard 12 above, with the significant difference that the keyboard directly furnished time-parallel signals (contact closures) to the shift register 188 for storage in its stages and for the conditioning of the memory contacts 224.

When a start bit is received over conductor 256, it again turns on the on-off multivibrator 192, starting the timing cycle of timer 194 The 35 ms. pulse is again provided to lead 240, but it has no effect at the transmitter, now turned off, and manual switch 250 is switched to the receive position, so that look gate 248 is not opened by this pulse. However, the 35 ms. pulse does turn on the timer 232, which generates, every 5 milliseconds during the 35 ms. period, a timing pulse which is supplied through the shift pulse former 234 to the shift bus of the register 188. The shift pulses thus generated are seven in number, and they occur precisely at the expiration of each 5 ms. interval following the received start pulse. A properly polarized replica of the start pulse itself is first applied to the first stage of the register, turning it on, and this condition is shifted to the right by the first shift pulse. Thereafter, when the first serial message bit pulse on lead 258 (if there is a pulse in the first position) is applied to the first stage of the shift register, it turns that stage "on," and the second shift pulse transfer that "on" condition to the second register stage, and so on. If there is no message pulse at one or more pulse positions in the series, the corresponding "off" condition of the corresponding stage will similarly be shifted to the right. At the end of six shift pulses, the entire message code group will set up in the register, with the last stage "on" because the start pulse is always present in every code group, and the last or seventh shift pulse also turns the entire register off, resetting all stages to the off condition. Just before this clearance of the register, however, the setup control 218 operates to supply operating current to the code coils in block 216, whose circuits are completed through individual transistors in turn rendered conductive by any corresponding stages of the register which are in the "on" condition. Any of the coils which are thus energized are held energized by the hold control 220 which furnishes holding current (but not operating current) to them over independent circuits, and consequently the corresponding contact sets of 224 are operated since the code coils are actually the coils of relays having those contacts, as mentioned above.

The precise message pulse group thus received in the first six stages of the shift register now appears as closures of the contacts at 224, and these operate to control the printing of the coded character exactly as in the case of keyboard control as described earlier. However, since manual switch 250 is now in the receive position, look gate 248 will now be opened (by a pulse on conductor 260) whenever the start pulse shifted through the register turns on the last (seven) stage of the shift register, as this signifies that the entire code group has been properly stored in the register. If this stored code is the carriage return code, sensor 244 immediately recognizes this fact, and initiates the carriage return and paper feed actions as described earlier. In addition, the carriage return control 252 supplies, through carriage squelch control 252, an "off" control pulse to inhibit the operation of the carriage advance control 208, the error delay circuit 202, and the print control 206, so that even if the carriage return operation should not be completed before the next succeeding character is received (due to an equipment malfunction) there will not be a character imprint at some random position along the blank line imprinting area passed over by the printing carriage during the return of the carriage, and which could well appear as an error in the next line.

If the code fully stored or registered in the shift register at the time the look gate 248 is turned on is the end-of-message code, it is similarly recognized in the sensor 246, whose output at 264 is used to turn off the station's data receiver equipment, and if desired to produce an end-of-message indication on the printed copy.

SCHEMATICS CORRESPONDING TO FIG. 10

Figure 11:
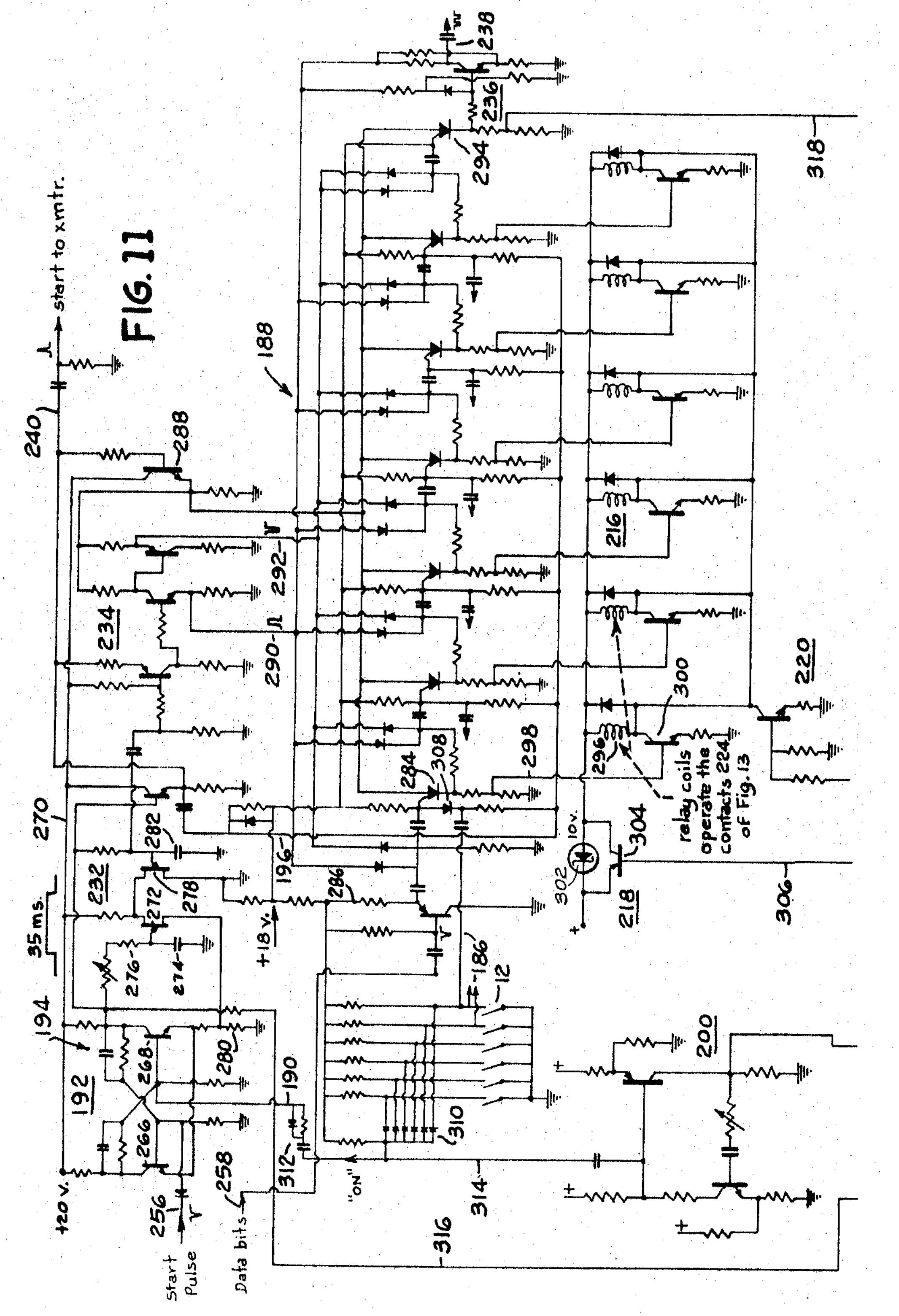
FIG. 11 is a schematic wiring diagram of components partly shown in block form in FIG. 10, especially those concerned with the control of the shift register by either the local keyboard or by received signals, and the setting thereby of printing control magnet coils ("code coils") of the apparatus.
Figure 12:
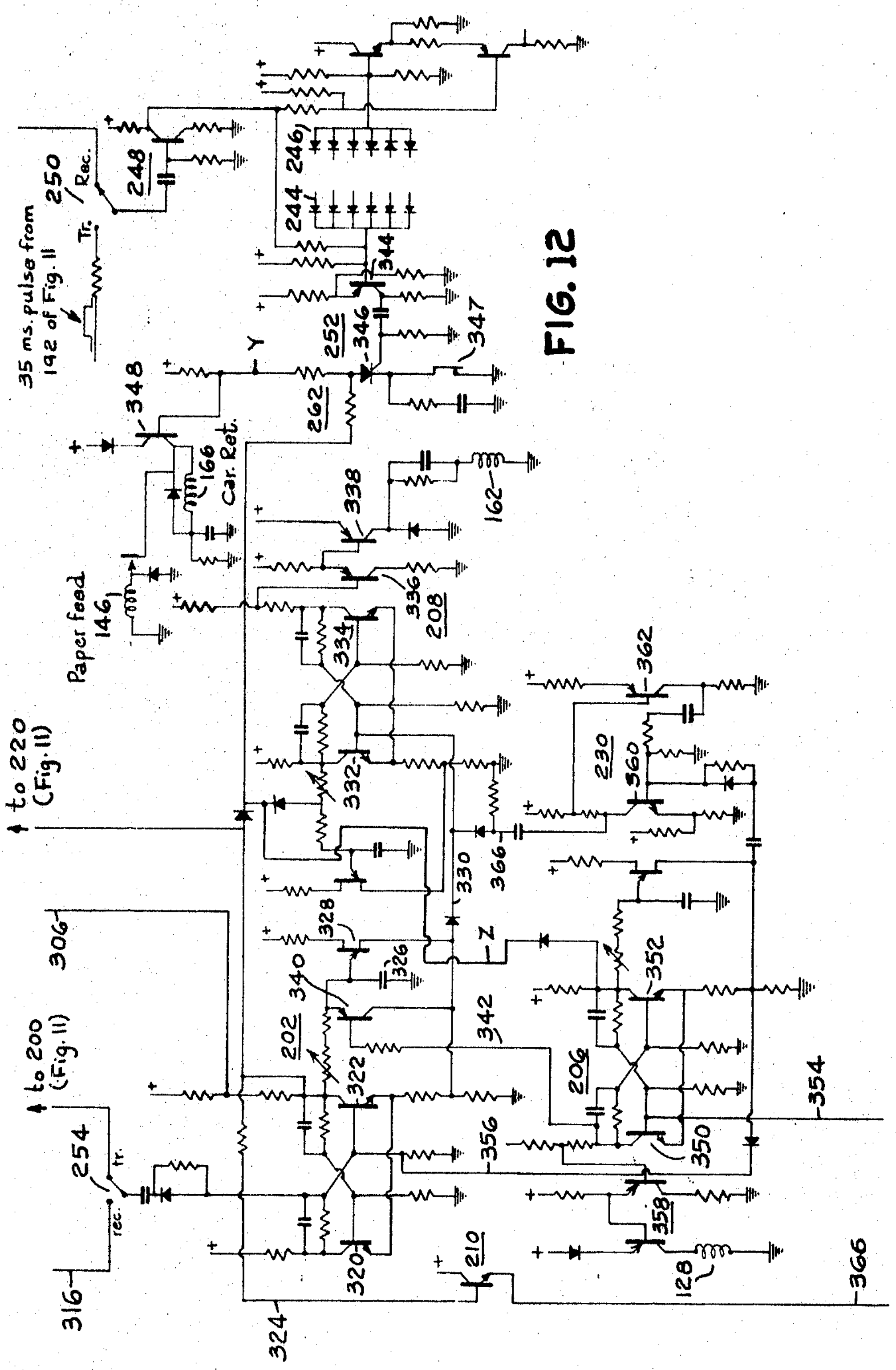
FIG. 12 is a similar wiring diagram of other components of the printer control circuitry, this figure being a continuation from the bottom of FIG. 11.
Figure 13:
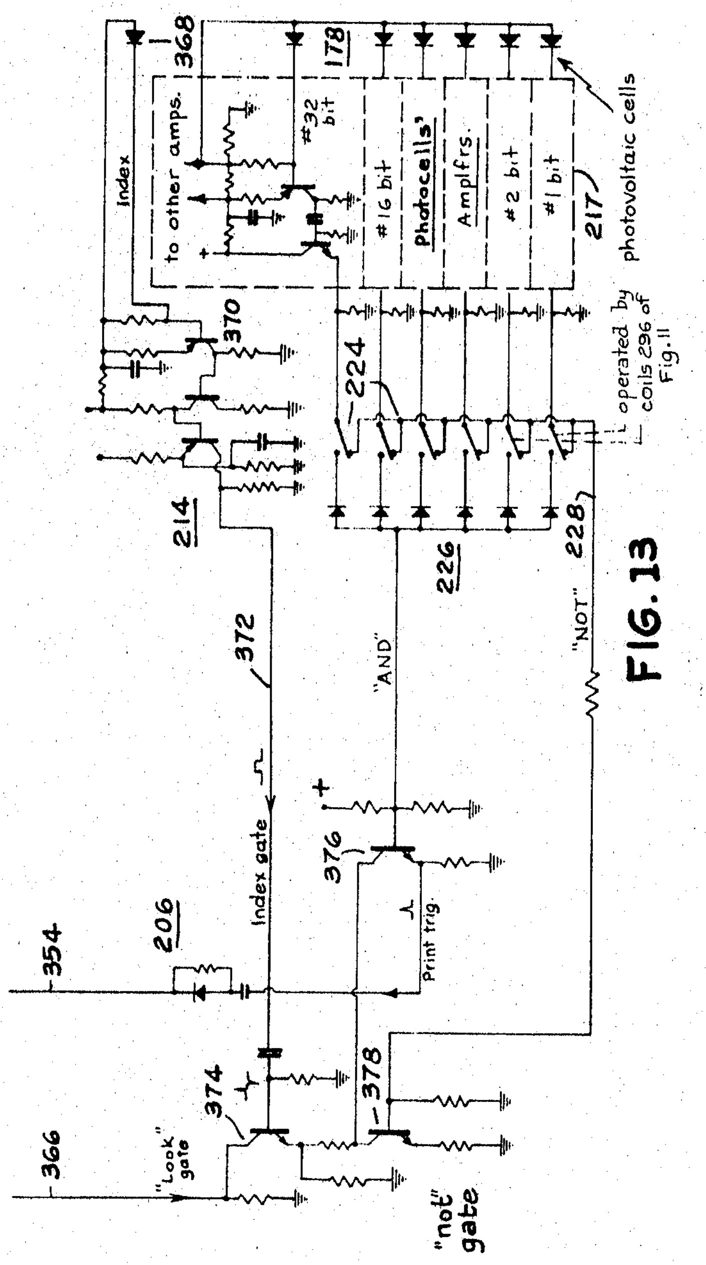
FIG. 13 is a further schematic diagram of circuitry associated with the foregoing, including printer control photo-cells and amplifiers, code memory contacts, and logic AND and NOT gates of FIG. 10; this figure is a continuation from the bottom of FIG. 12.

FIGURES 11, 12 and 13 are drawn so that they may be connected, one beneath another, to provide a complete wiring schematic of the components which have just been generally described in connection with FIG. 10. The major operating units which have been assigned reference numerals in FIG. 10 and elsewhere are identified by the same numerals in these three figures, with such additional numerals as are deemed necessary to a full understanding of the construction disclosed. However, in setting forth these circuit details, it is not intended to limit the invention to this specific circuitry, as variants thereof will readily occur to those skilled in the art.

The on-off control 192 in FIG. 11 comprises the transistors 266 and 268 connected in the usual flip-flop configuration which is turned on by the start pulse at 256, initiating the 35 ms. pulse on conductor 270, and also supplying positive voltage to the emitter of a unijunction transistor 272 at the junction of timing capacitor 274 and a timing resistance made up of resistor 276 and a trimmer resistor for convenient calibration. Capacitor 274 is normally discharged, and charges up when the flip-flop goes on, but when transistor 272 conducts the capacitor commences discharging to ground over resistor 280. This R–C circuit is adjusted so that the capacitor would not be fully discharged until slightly more than 35 milliseconds have elapsed after the flip-flop is turned on.

At the same time as transistor 272 was supplied with positive voltage from the flip-flop, unijunction 278 was simultaneously supplied, commencing the discharge of a second R–C circuit including capacitor 282, so chosen that the capacitor will discharge every 5 milliseconds precisely. Due to the common coupling in the base-two circuits of the two unijunction transistors, the first unijunction 272 will fire precisely on the seventh pulse from the unijunction 278, and the period of the first unijunction will be exactly 35 ms., or 7 of the periods of the second unijunction, as in a frequency divider. The discharge of the capacitor 274 associated with unijunction 272 resets the flip-flop because of the current flow through its base-one electrode circuit and resistor 280 in the emitter circuits of both of transistors 266 and 268.

It will be noted that the first stage silicon switch 284 of the shift register will be turned "on" in advance of the occurrence of the first shift pulse by the connection through circuit 286 to the gate thereof from the base-two electrode of the unijunction 278, when the latter starts to conduct due to the turning on of the flip-flop by the incoming start pulse. Hence, the start pulse, or a counterpart thereof, is applied to the shift register and shifted along it in advance of the message code bits or pulses. This is so that the arrival of the start pulse of each code group at the seventh stage of the register can be used to operate the look gate 248 as already described. The positive supply voltage for the entire shift register is obtained from the transistor emitter follower 288 in turn supplied by the output of the flip-flop 192, so that the entire shift register will be turned off (and all stages reset to their nonconducting condition) at the end of each code group. As the message code bits advance through the register, under the control of the shift pulses provided over lead 290 and the stage reset pulses over lead 292 from the shift pulse former 234, the successive silicon switches (corresponding to switch 284) become in turn conducting and non-conducting in accordance with the progress of the received pulses from input 258, and when the first pulse in (corresponding to the start pulse) turns on the last or seventh stage switch 294, the look gate 248 (FIG. 11) is operated as above described to allow the special code sensors to be utilized as already described.

If the relay operating coils of unit 216 (typified by the first coil 296) were merely connected in series with the cathodes of the silicon switches, these relays and their contacts would undergo the same progression of states as the shift register stages, which is not desired. Instead, the cathode of each silicon switch provides operating current over a lead 298 to a transistor switch 300 for each coil, but the supply voltage for such coils is provided in common to all of them through a Zener diode 302 chosen (for example, for a ten-volt drop) to reduce the coil currents, even with switches 300 in their conducting states, to half the rated pull-in value. A further transistor switch 304 is shunted across the Zener diode, and when it is rendered conducting over control lead 306, a part of setup control 218 of FIG. 10, the coil currents corresponding to the switches 300 that are on at the completion of the shift register's advanciing action will be raised to the pull-in value, and the corresponding relay contacts (224 of FIG. 10) will operate.

It will be noted in FIG. 11 that the source of current for the coils 296 includes the transistor switch 220, the "hold" control of FIG. 10, so that the operating currents of all the coils can be fully interrupted by the opening of this switch 220. This is necessary in the case of electromagnetic relays as storage devices in the embodiment being described, because the mere opening of shunt switch 304 would only reduce the coil currents to approximately half the pull-in value, which value of current might be sufficient to hold operated (though not to pull in) such relays. In actual fact, switch 304 is indeed opened immediately after the appropriate coils have been energized, so that the current consumption of those which have been operated can thereby be sharply reduced for the remainder of the storage period, and so that during the following character period, the new setup of the shift register will not effect the contacts until the very end again.

FIG. 11 also diagrams the contact array of the keyboard 12, and the connection of a typical key conductor 186 to the gate electrode of the first-stage silicon controlled switch 284 over a coupling capacitor and isolating diode 308. Each of the ungrounded contacts of the keyboard busses is connected through a diode (array 310) and the coupling network 312 to the base of flip-flop transistor 268, this arrangement serving to turn the flip-flop on-off control "on" in the case of keyboard operation, and being therefore fully analogous to the turning "on" of the flip-flop by the start pulse of a received message group. The 2 ms. delay circuit 200 is introduced in the lead 314 from the same diode array 310 for application to the error delay circuit to be described in connection with FIG. 12. When this delay is not to be used, that is, during operation from received pulse code groups, the conductor 316 conveys an equivalent start pulse voltage to the error delay circuit from the output of the flip-flop 192.

As already indicated, the self-shifting shift register 188 is employed also for serializing the pulses to be applied to the transmitter over output lead 238 (at the right end of FIG. 11) in the case of keyboard control of the transmitter (and printer). In that case, the operation of the keyboard 12 supplies turn-on voltages simultaneously to the gate electrodes of all of the silicon switch stages such as 284 which are involved in the code called for by the operated key. The "start" or common-conductor pulse from the keyboard, via diode array 310, also turns on the flip-flop 192, and the pulse shifting circuit then proceeds to advance or shift the register at 5 ms. intervals following the transmission of an actual start pulse to the transmitter over lead 240. It follows that the last shift register stage 294 takes up in turn the conditions corresponding to the selected pulse code group succession, as the register shifts all of the stage conditions "over the end" of the register. The last stage sampling gate 236 (see also in FIG. 10) is energized in proper cadence since it derives its power supply from the shift control conductor 290, and the properly serialized code pulses are thus made available to the transmitter at 238. A conductor 318 from the cathode resistor string of the last shift register switch provides power for the look gate 248 and the special code sensors to be detailed in FIG. 12.

Turning now to FIG. 12 of the drawings, the error delay 202 of FIG. 10 is shown as a timing multivibrator comprising a pair of cross-connected transistors 320 and 322, which is turned on by the pulse from switch 254 as already described, and which thereupon turns on "look" gate 210 over the conductor 324. In a manner similar to the on-off control flip-flop, the timing multivibrator commences to charge up the capacitor 326 through a suitable resistor. The unijunction transistor 328 is arranged to discharge the timing capacitor when it approaches full charge, this time being adjusted to be slightly longer than the time required for one full revolution of the print wheel of the printer. When this discharge occurs, the unijunction supplies a voltage over lead 330 to fire a monostable multivibrator comprising transistors 332 and 334, which form a part of the carriage advance control 208 and provide approximately a 12 ms. pulse of amplitude sufficient, after amplification by transistors 336 and 338, to operate the carriage advance magnet 162. It follows that a carriage advance will occur at least at the end of the maximum "on" time of error delay 202 (35 ms.) following receipt of a start pulse or its corresponding pulse on lead 316, even if no printing or functional code has been recognized.

However, the timing capacitor 326 of the error delay, unlike the corresponding capacitor of the on-off control 192, is shunted by a transistor switch 340, which is rendered conductive whenever print control 206 is energized as over lead 342, thus discontinuing the action of the error delay where a code is recognized by the print wheel code disc, and resetting the error delay multivibrator 202 in preparation for another cycle thereof. As already described, the special code sensors 244 and 246 are shown as formed by arrays of diodes properly poled to produce respective output voltages only when a carriage return code or an end-of-message code has been set up in the shift register. In the case of a carriage return code being recognized, the output of array 244 is amplified by a transistor 344 controlling the gate of a silicon controlled switch 346 included in cariage return control 252. When the switch conducts, power control transistor 348 supplies current to both the carriage return magnet coil 166 and the paper advance magnet 146. Normally closed contacts 347 lying in the path of the fully returned carriage are in the cathode circuit of silicon controlled switch 346; these contacts open upon return of the carriage, resetting 346.

Print control 206 comprises a multivibrator comprising transistors 350 and 352, fired by a print command signal on lead 354 that is generated when the type wheel has brought the sought-for character into the proper position for imprinting, as will be described below. Besides controlling the error delay transistor switch 340 over lead 342 as above mentioned, the print control 206 resets the error delay multivibrator over lead 356 and discharges capacitor 326 to lead 330 to produce the carriage advance pulse in the normal case where carriage advance is called for following the printing of a character (rather than called for by the absence of a recognized code group following a start pulse). Also, print control 206 directly energizes the printing hammer magnet 128 via the transistor power amplifier 358.

FIG. 12 also shows the circuitry of the "adjacent pulse" delay 230 described above, which prevents the carriage advance control 208 from attempting reoperation before the mechanism has had time to be restored after a preceding print cycle. This can happen, for example, if a character is called for that closely follows (on the type wheel) the previously printed character, so that the carriage advancing mechanism would be called upon to reoperate before it had fully restored itself to ready condition. As already described, a print command signal on conductor 354 would normally fire the print control multivibrator 206 (and thereby energize the carriage advance control 208) as soon as the called-for character had arrived at the printing position as detected by the type wheel position-sensing photocells. In order to prevent this too-soon reoperation of the carriage advance control for certain character combinations, and without delaying the printing cycle with respect to all possible successions of characters, the continguent 8 ms. delay provided by adjacent pulse delay 230 is introduced only when a print command signal occurs early (in the first one-third or so) in the print-wheel searching cycle.

Such a contingent 8 ms. delay is provided by the multivibrator formed by transistors 360 and 362 of delay 230, triggered from the leading edge of the print signal generated by print control 206 on lead 364. Delay multivibrator 230 then supplies a delayed trigger over lead 366 to the carriage advance control 208. Thus, if a print command occurs before the carriage advance mechanism has had time to recover, the signal to that mechanism will be delayed sufficiently to permit proper operation. On the other hand, if the print command occurs during the last ⅔ of the wheel search cycle, the carriage advance control 208 will be immediately energized over conductor 330 by the discharge of capacitor 326 when the error delay multivibrator 202 is reset from printing control 206 over lead 356.

It might appear that this arrangement would sometimes produce two triggers to the carriage advance control 208 for one print command, as when an early-in-the-cycle command operated both through the delay 230 and the delay 202. However, since the charging of capacitor 326 requires a certain length of time, it is found that its level of charge at the time of an "early" print signal is inadequate to produce a duplicating operation of the carriage advance control 208. It is, of course, necessary that the delay time of the multivibrator 230 be slightly shorter than the duration of the carriage advance pulse itself (12 ms. in the example) to avoid a duplicate carriage advance operation.

Turning now to FIG. 13, which is a continuation of FIG. 12, the code memory contacts 224 are the contacts operated by the relay coils 216 of FIG. 11, and are shown in unoperated position. The movable contact of each set is supplied with voltage from a corresponding amplifier of the set 217, which are in turn energized by the respective photocells which receive the light pattern transmitted through the code wheel 172 of FIG. 6. The particular photocell which is energized by the light passing through the complete row of "index" apertures at the rim of the code wheel is numbered 368, and its output is amplified at 370 to control the index gate 214. As each character on the wheel arrives at a position where it could be printed, the index gate 214 supplies a pulse over lead 372 to turn on the transistor switch 374 which is in series with the "look" gate lead 366 and the printing command trigger switch 376, which thus receives its power over lead 366 contingent upon the "look" gate and the index gate. A "not" gate is provided by conductor 228 multipled to all of the normally closed or back contacts of the relay contact sets 224, and thus if any of the contacts 224 are not operated, but are energized with voltage from their corresponding photocell amplifiers, a voltage is supplied by lead 228 to turn on the switch 378 which shunts the switch 376 and prevents a print trigger from being supplied to output lead 354. Therefore, a print trigger will be supplied only when the pattern of contact closures of contacts 224 matches the pattern of application of voltages to the movable contacts thereof from amplifiers 217, and then only when the index gate signal is present and the "look" gate conductor 366 is energized. When these events occur simultaneously, the printing magnet 128 will be energized, and the selected character will be manifested on the printer's impression paper.

SCHEMATICS OF THE TRANSCEIVER

For use in its typical application for the transmission of data and printer operating codes over an ordinary telephone line, local or long distance, the invention provides the apparatus generally indicated in FIG. 1 as coupler 22. The function of the coupler is to put the start and data bit pulses that are generated as earlier described, into the form of pulsed tone frequencies suitable for direct acoustic (or equivalent) coupling into the transmitter or microphone of a telephone instrument. It also provides for the control of the printer from incoming pulsed tone frequencies coupled out of the receiver of such a telephone instrument. Except for special features to be described, most of the components of the coupler are well known in connection with the transmission of pulse information by coded tones.

Figure 14:
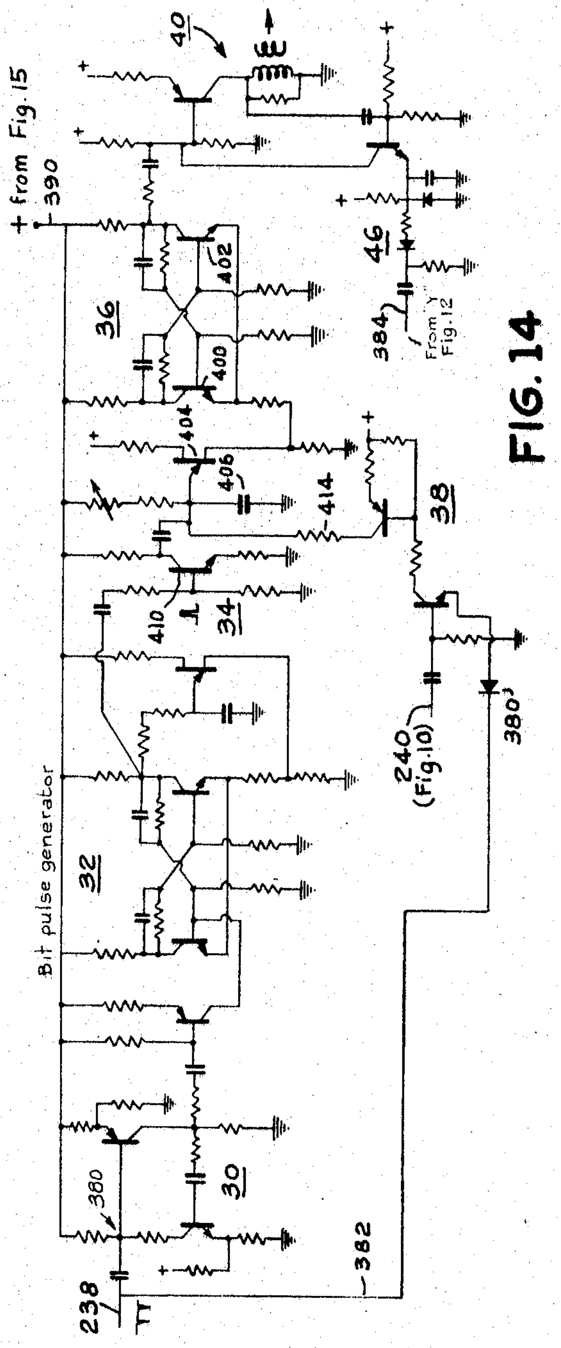
FIG. 14 is a schematic wiring diagram of the upper portion of FIG. 3, showing the equipment provided to convert signals from the printer, as a transmitter, into suitable data tone form for transmission over the signal channel.
Figure 15:
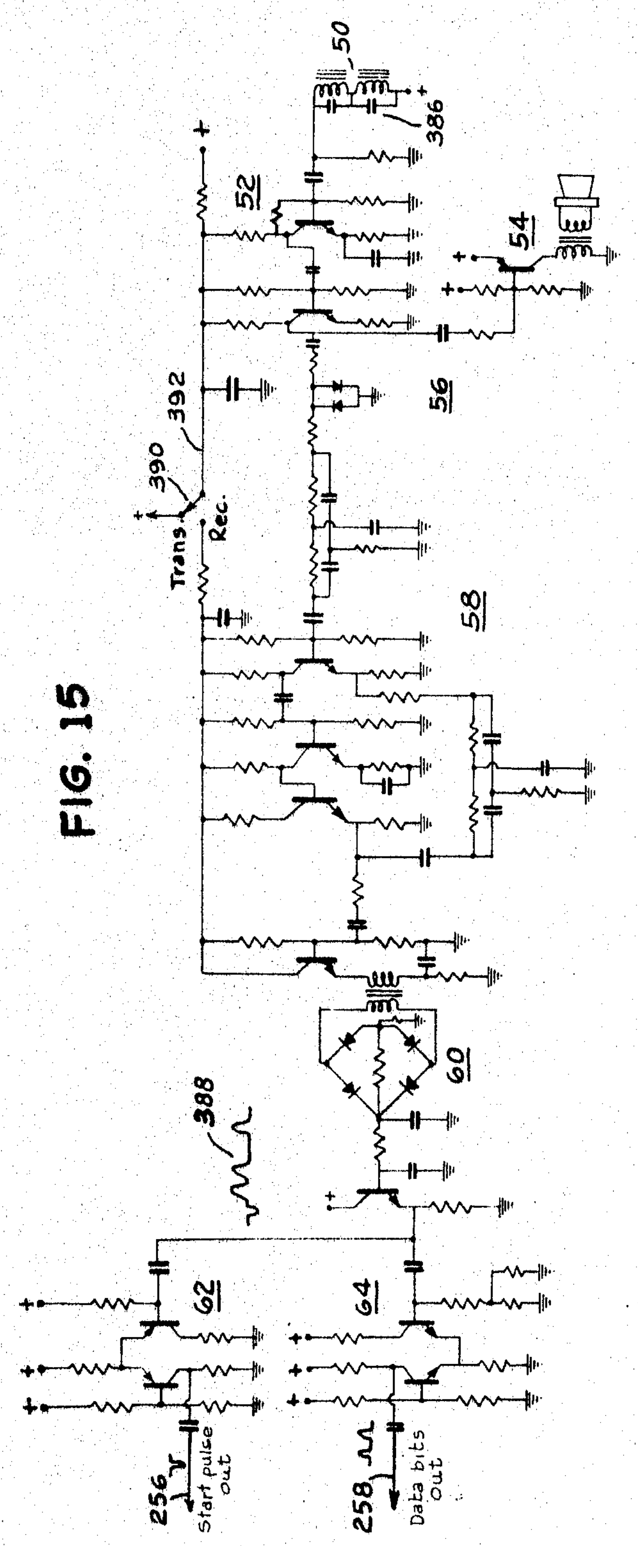
FIG. 15 is a similar diagram of the components of the "receiving" portion of FIG. 3, by which incoming pulse groups are converted to suitable form, and otherwise employed to control the printer as a receiver.
Figure 16:
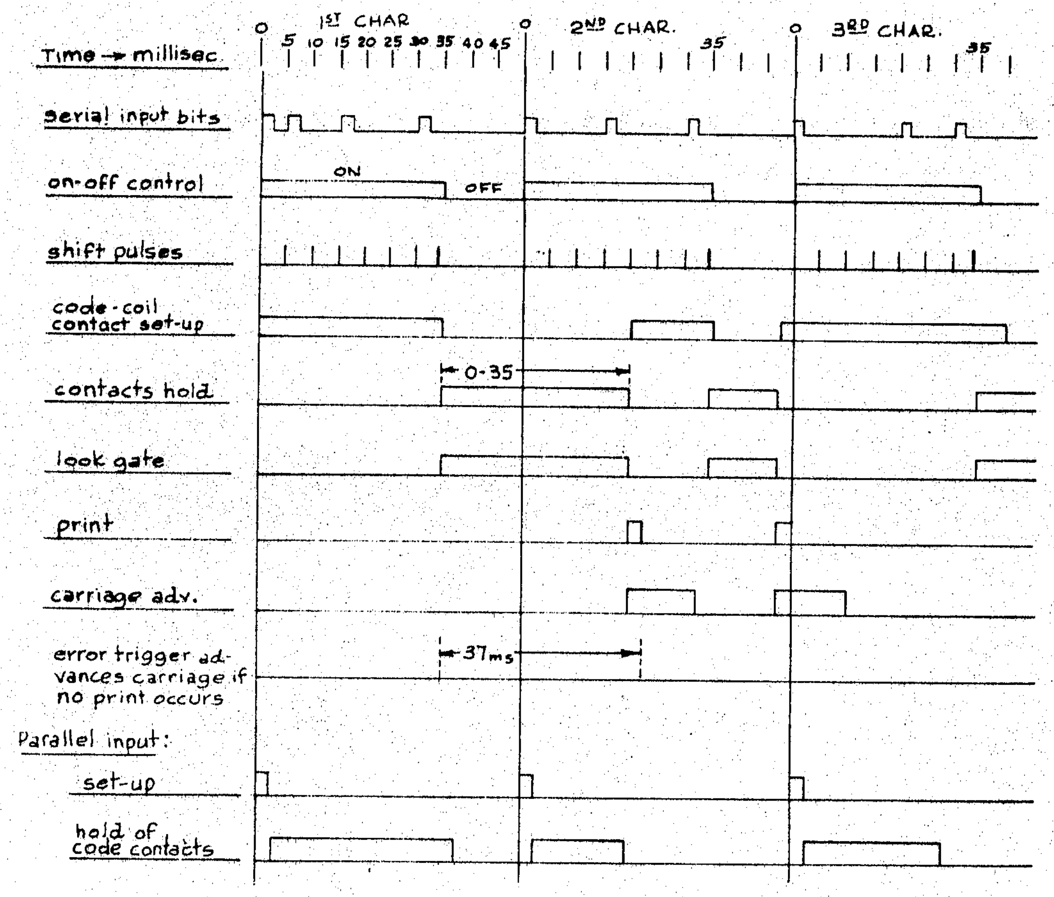
FIG. 16 is a chart of the relative timing of major events in the cycles pertaining to several successive characters.

The principal components of the coupler, or transceiver, were shown in block form in FIG. 3 of the drawings, and the same reference numerals used in that figure have been applied to the major components shown in schematic form in FIGS. 14 and 15. Thus, in FIG. 14, the direct current bits are shown arriving at the transmitter over conductor 238 (from the right end of FIG. 11) and the "data" bits operate the 2-millisecond delay circuit at 30, and then the bit-pulse modulator 32 which is a monostable multivibrator applying properly shaped counterparts of the mark and space condition pulses to the bit modulator 34. Each "mark" bit operates the modulator 34 to cause oscillator 36 to shift momentarily from its "center" frequency of (say) 1600 c.p.s. to a value of 1400 c.p.s. The tone-shifted output is applied to the output amplifier 40 and a transformer which couples the tone pulses to the "speaker" 42 of FIG. 3, or to a wire line or the like.

The start bits (of opposite polarity) are received over conductor 240 (see FIG. 10) and applied to the start-bit modulator 38 which operates to shift the "center" frequency of oscillator 36 to the value, say, of 1850 c.p.s. These start bits are properly timed so as to precede the data bits of the corresponding groups. It may be noted that the power supply for all of the components just described is obtained at point 382 from the "transmit" terminal of a transmit-receive switch to be described in connection with FIG. 15. Also, a connection from the point Y of FIG. 12, to a conductor 384, turns on a tone oscillator or generator 46 also coupled to the output amplifier 40, whenever a carriage return operation is being carried out by transistor 348 of FIG. 12. This signal tone, being audible at the far end of the telephone line, notifies the operator (especially at the start of a transmission) that a new transmission (or a new line) is commencing.

The oscillator modulation scheme of FIG. 14 is distinctively novel. Tone-shift oscillators of this general type have always been plagued by the presence of unavoidable momentary frequency transients at the instants when a frequency change is called for, these appearing as a form of phase jitter resulting from the variation in state of the fundamental frequency wave at the particular instant when the tone-shifting control is applied or cut off. In FIG. 14, the basic oscillator comprises a symmetrical multivibrator formed by the transistors 400 and 402, and it is continually being set and reset by the unijunction 404 which forms with capacitor 406 and trimmable resistor string 408 an R-C oscillator operating at twice the "center" frequency.

When a data bit is called for, the transistor 410 switches an additional capacitor 412 in parallel with capacitor 406, lowering the frequency of the unijunction oscillator correspondingly, while when a "start" bit is called for, the transistor 414 switches in an additional resistor 414 in parallel with capacitor 406, raising the frequency. In both cases, the effective output frequency is divided by two in the multivibrator to provide the desired final values. The result is a practically instantaneous modulation of the output frequency, without phase jitter and without appreciable amplitude changes as amongst the free frequencies desired. The output wave is sinusoidal, due to the smoothing action of the components following the multivibrator.

FIG. 15 shows the circuitry of the receiver portion of the coupler, modulated start and data-bit tones being coupled out of the telephone receiver by unit 50, preferably a pair of magnetic cores individually tuned to the start pulse frequency and the data bit frequency by respective condensers as at 386. The cores are placed near the winding of the telephone receiver, and their signal output is amplified at amplifier 50 and applied to the audible signal "chirper" 54 for supervision by the operator if one is present. The amplified tones also pass to the limiter 56 as conventional, the discriminator 58, and the demodulator 60 of diode bridge configuration, whose output as indicated at 338 consists of positive- and negative-going pulses which are routed to the output lines 256 and 258 by the respective signal slicers and separators 256 and 258. These outputs form the inputs to FIG. 11 when the equipment is receiving from the line. Switch 390, the transmit-receive switch mentioned above, is assummed to be in the "receive" position during the above operations, applying direct current operating power to the discriminator 58, and later stages, from supply line 392. Note that the chirper oscillator 54 would be operated even if the switch were in the wrong position, so that receiving attendant could make a correction of the switch position if necessary.

What is claimed is:

1. A printer comprising a rotary printing element carrying individual deflectable character-printing formations along a marginal area thereof, a support for an impression sheet arranged to present an impression line area thereof adjacent the path of said formations during rotation of said element, the plane of said path being substantially parallel to said impression line area, means for continuously rotating said element to bring said formations sequentially into impression position relative to such line area, means for deflecting successive selected ones of said formations momentarily away from the body of said printing element and into impression relationship, and means for enabling the operation of said deflecting means in timed relation to the rotation of said printing element.

2. A printer according to claim 1 further comprising: moving means for causing a relative movement along said impression line area between said printing element and said support after each printing operation.

3. A printer according to claim 2 further comprising: means for inhibiting the operation of said moving means during a predetermined time interval following each operation of said moving means.

4. A printer according to claim 1 further comprising means for moving said element relative to said support.

5. A printer according to claim 4 further comprising means for stepping said element relative to said support in a direction parallel to the length of said line area, once for each operation of said deflecting means.

6. A printer according to claim 5 wherein said enabling means is pulse series responsive.

7. A printer according to claim 4 further comprising
(a) a shaft mounted parallel to the length of said line area,
(b) a carriage slidable along said shaft, and
(c) means for operably mounting said rotary printing element on said carriage.

8. A printer according to claim 7 wherein:
(a) said means for continuously rotating said element comprises gearing on said carriage connecting said rotary element for continuous rotation by said shaft in all positions of said slidable carriage,
(b) said means for deflecting successive selected ones of said formation comprises driving means on said carriage for selectively driving selected character-printing formations against the impression sheet as said formations are brought into juxtaposition to said line area, and
(c) said means for enabling comprises selecting means controlled by the rotary position of said shaft for enabling operation of said driving means solely in timed relation to the motion of said selected printing formations into juxtaposition to said impression line.

9. A printer according to claim 4 further comprising:
(a) a rotary shaft,
(b) a printing carriage slidable along said shaft and carrying said rotary printing element on said carriage to be continuously rotated by said shaft,
(c) said printing element being geared to said shaft for conjoint rotation thereof in all positions of said carriage along said shaft, said reflecting means comprising electrically operated impact control means on said carriage, and
(d) said enabling means comprising means responsive to successive pulse combinations for preparing an operating circuit for said deflecting means, and means controlled by the rotary position of said shaft for completing said operating circuit for said deflecting means to operate said deflecting means as the selected printing formations arrive in printing position relative to said impression sheet.

10. A printer in accordance with claim 9, including means for stepwise advancing said carriage along said shaft to print successive characters in a line along the impression sheet.

11. A printer in accordance with claim 10, including means responsive to the receipt of invalid pulse combinations for operating said carriage advancing means independently of a printing operation.

12. A printer in accordance with claim 10, including means for inhibiting the energization of said deflecting means during a period following each operation of said deflecting means.

13. A printer in accordance with claim 10, including means for inhibiting the repeated energization of said carriage advancing means during a period following each operation of the latter.

14. A printer in accordance with claim 10, including means for returning said carriage in the direction opposite to its stepwise advancing movement, and means for inhibiting the energization of said deflecting means during a period following energization of said carriage returning means.

15. A printer according to claim 4 wherein said rotary printing element further comprises a circular array of spokes each carrying at one side of its free outer end a character imprinting formation in a plane substantially parallel to the plane of said wheel, each of said spokes having a substantial resilience in the direction perpendicular to the plane of said wheel, and each being additionally resilient in a direction circumferential to said circular array.

16. The combination of claim 15, in which the lateral edges of the outer ends of said spokes are bevelled in the plane of the spoke thickness, on the side opposite the printing formation; the angle between the bevelled edges and the printing-formation side being an acute angle.

17. A printer according to claim 15 wherein said deflecting means further comprises:
(a) hammer means, and
(b) means for driving said hammer means at a predetermined velocity against the side opposite said one side of said free outer end of a selected spoke to effect a printing operation, the natural resonant frequencies of said spokes being so related to the velocity of said hammer means as to dispose of secondary contact interference.

18. A printer according to claim 4 adapted for use in a printing station for a telecommunications system and using sets of pulse combinations for the control of printing functions and further comprising:
(a) a keyboard adapted to set up pulse combinations for control of said printer,
(b) input and output signal coupling means for connecting said station to a signal channel,
(c) a plural stage pulse register connected to register pulse combinations selected by said keyboard,
(d) a plurailty of pulse storage devices connected individually to the stages of said pulse register,
(e) pulse distributing means connected between said input signal coupling means and said pulse register to register therein pulse combinations received over said channel,
(f) means for cycling said pulse register to apply the pulse combination registered therein in serial form to said output signal coupling means, and
(g) means including said storage devices for controlling the operation of said printer.

19. A printing station in accordance with claim 18, in which said pulse register is a shift register.

20. A printing station in accordance with claim 18, in which said pulse register is a ring counter.

21. A printer according to claim 4 adapted for use in a printing station for a telecommunications system and further comprising:
(a) input signal coupling means for connecting said station to a signal channel,
(b) a plural stage pulse register connected to register pulse combinations received from the input signal coupling means,
(c) a plurality of pulse storage devices connected individually to the stages of said pulse register, and
(d) means, including said storage devices, for controlling the operation of said printing element during registration of a succeeding pulse series by said pulse register.

22. A printing station in accordance with claim 21, in which each stage of said pulse register comprises a controlled rectifier switch, and in which each of said storage devices includes an electromagnetic relay.

23. A printing station in accordance with claim 21, including means connected to said register for recognizing particular codes registered therein which correspond to special printer functions, and means controlled by said recognizing means for initiating such printer functions independently of the operation of said pulse storage devices.

References Cited

UNITED STATES PATENTS

| | | | |
|---|---|---|---|
| 2,926,602 | 3/1960 | MacDonald et al. | 101—93 |
| 3,289,805 | 12/1966 | Kleinschmidt et al. | 197—53 |
| 1,189,449 | 7/1916 | Highley | 197—54 |
| 2,236,663 | 4/1941 | Adams | 197—53 |
| 3,291,909 | 12/1966 | Clark et al. | 178—25 |

THOMAS A. ROBINSON, Primary Examiner

U.S. Cl. X.R.

101—93; 178—34; 197—53